United States Patent

[11] 3,548,873

| [72] | Inventors | Herbert W. Kaatz |
| | | Elyria; |
| | | Fred R. Wilhelm, Avon Lake, Ohio |
| [21] | Appl. No. | 737,791 |
| [22] | Filed | June 17, 1968 |
| [45] | Patented | Dec. 22, 1970 |
| [73] | Assignee | Airborne Mfg. Co. |
| | | Elyria, Ohio |
| | | a corporation of Ohio |

[54] MULTI-STAGE PRESSURE RELIEF APPARATUS
16 Claims, 2 Drawing Figs.

[52] U.S. Cl. ................................................. 137/612.1
[51] Int. Cl. .................................................. F16k 17/04
[50] Field of Search ...................................... 137/612.1, 613, 512.1, 512; 251/30

[56] References Cited
UNITED STATES PATENTS

| 862,867 | 8/1907 | Eggleston .................... | 251/61.1 |
| 1,731,519 | 10/1929 | Bastian ........................ | 137/612.1X |
| 2,333,913 | 11/1943 | Beam .......................... | 137/612.1X |
| 2,613,683 | 10/1952 | Baird et al. .................. | 137/512X |
| 2,620,791 | 12/1952 | Versoy et al. ................ | 137/612.1X |
| 2,645,243 | 7/1953 | Turner ........................ | 137/512 |
| 3,246,641 | 4/1966 | Goehring .................... | 137/612.1X |
| 3,323,535 | 6/1967 | Klemm et al. ................ | 137/505.12X |
| 3,375,845 | 4/1968 | Behm .......................... | 137/512.1X |
| 3,434,690 | 3/1969 | Troncale Sr. ................ | 251/30 |
| 3,207,179 | 9/1965 | Klagues ...................... | 137/612.1 |

FOREIGN PATENTS

| 960,942 | 3/1957 | Germany ..................... | 137/612.1 |
| 1,104,780 | 4/1961 | Germany ..................... | 137/612.1 |

Primary Examiner—Samuel Scott
Attorney—Bosworth, Sessions, Herrstrom and Cain

ABSTRACT: A multistage pressure controlling apparatus for selectively limiting the pressure in a pressure pneumatic system at predetermined levels. Each stage comprises a pressure relief valve having a unique set point. Self-energizing means are provided which prevent and permit functioning of selected stages of the apparatus. The stage with the the lowest set point permitted to function determines the level of system pressure. The disclosed embodiment is a two-stage apparatus adapted to selectively limit system pressure to one of two predetermined set pressures.

PATENTED DEC 22 1970

3,548,873

INVENTOR.
HERBERT W. KAATZ
BY FRED R. WILHELM
Bosworth, Sessions,
Herstrom & Cain,

ATTORNEYS ized to the flange 23 of cap 21. Clamped between the
3,548,873

MULTI-STAGE PRESSURE RELIEF APPARATUS

BRIEF SUMMARY OF INVENTION

This invention is directed to means for limiting the operating pressure of a pressure pneumatic system to a selected one of a plurality of predetermined levels. Such a pressure pneumatic system may be intended, for example, to provide a pnuematic load with pressure at different levels at different times from a variable pressure source. The invention also comprehends means by which the pressure in a pneumatic system may be limited or not limited to a predetermined maximum pressure as may be desired from time to time.

This invention particularly finds utility in pressure pneumatic systems of modern light aircraft. The source of pressure in such systems is an engine-driven positive displacement pump or pumps having a variable output resulting from the wide range of engine speeds required during the aircraft operation. The pneumatic load supplied by these pumps may also vary. In addition, different ones of the loads normally found in light aircraft pressure pneumatic systems require different operating pressures. For example, autopilots and gyro instruments may be designed to operate at or about 7 p.s.i. De-icer boots, on the other hand, require a higher pressure of, for example, 15 p.s.i. This higher pressure is used to inflate the boots for only a brief period at regular intervals. During these inflation periods, it is necessary to limit the system pressure to the higher level required for boot inflation. The remaining time, it is desirable to limit the boot pressure to the lower value desired for optimum operation of the autopilot and gyro instruments. The shore periods of high pressure provided during boot inflation can be tolerated by the other load elements without any undesirable results.

When utilized in light aircraft pressure pnuematic systems as described above, this invention is embodied in a two-stage pressure limiting apparatus as disclosed below. Also, in this embodiment, the pressure is always automatically limited to the higher of two selected levels and may be limited to the lower of two levels, as desired. Other combinations of pressure control may be provided by apparatus within the scope of this invention. For example, two or more pressure levels may be provided with or without a maximum limitation on system pressure as may be desired from time to time.

The apparatus embodying this invention generally and particularly as described below is composed of a number of elemental units which combine and cooperate to accomplish the objects of this invention. In addition, each of these elemental units finds utility in and of itself and is believed to have separate novelty over and above the novelty found in the combination of which it is also a constituent part.

Each of the aforementioned elemental units includes a pressure relief valve of the diaphragm type and having an adjustable set point pressure at which it opens. The valve is especially adapted to operate quietly and with a minimum of chatter.

One form of these elemental units includes means for disabling the pressure relief valve; i.e., preventing the valve from operating even at pressures at and above its set point level when and as may be desired. As comprehended by this invention, the means for doing so permit a relatively small force to control a relatively much larger force because of the self-energizing mode of operation employed. In the embodiment shown, this form of the elemental unit is actuated by an electric solenoid, although other means may also be employed as may be convenient or desired.

The two-stage embodiment shown in the accompanying drawings and described below comprises two elemental units. Both are adapted to function as pressure relief valves, but are set to provide relief at different pressures. The valves have a common inlet connected to the pressure system; and, when either one is open, the system is vented to atmosphere. The unit set to open at the lower of the two pressures is provided by solenoid-actuated, pneumatically-operated, self-energizing means for disabling or preventing its associated valve from opening. When this valve is not disabled, it limits system pressure to its set point level, the lower of the two provided by the apparatus. When this unit is actuated and its valve disabled, system pressure is limited by the other unit to its set point level, the higher of the two levels provided. For example, the solenoid-actuated unit may be set to limit system pressure to 7 p.s.i. and the other unit set to open at 15 p.s.i. During the brief periods requiring the higher pressure for boot inflation in a light aircraft pressure system, the lower set point solenoid-actuated valve may be disabled by energization of the solenoid so that system pressure is limited by the higher set point unit. During the majority of time when the higher pressure is not required for boot inflation, the solenoid is deenergized and system pressure is limited to the lower of the set point levels provided.

It will be noted that the elemental unit having a solenoid associated therewith for permitting and preventing operation of its pressure relief valve, as desired, is separately useful for selectively providing a fixed limit to the pressure in the system and no limit at all, depending upon whether or not the valve is disabled. Also, the elemental unit having no solenoid associated therewith can operate by itself to provide a reliable, economical, quiet, and chatter-free, single-step, diaphragm-type pressure relief valve.

DETAILED DESCRIPTION OF A PREFERRED EMBODIMENT

Figure 1:
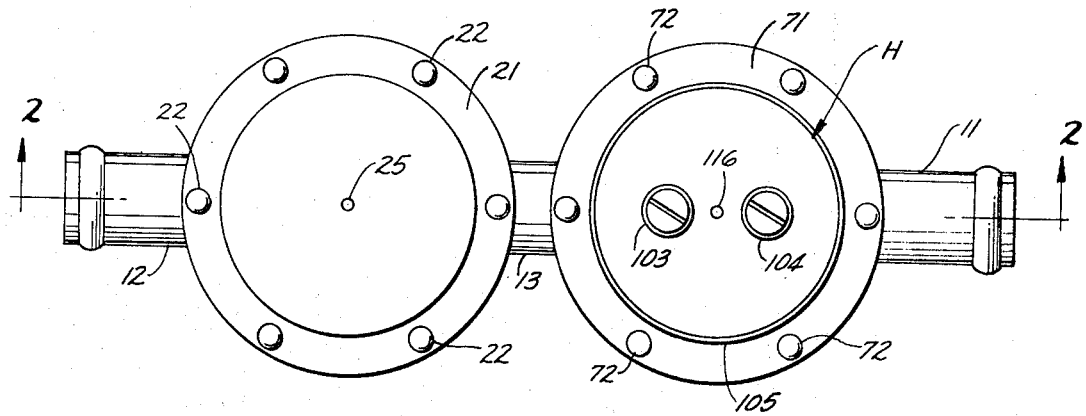
FIG. 1 is a top elevation view of a two-stage embodiment of this invention.
Figure 2:
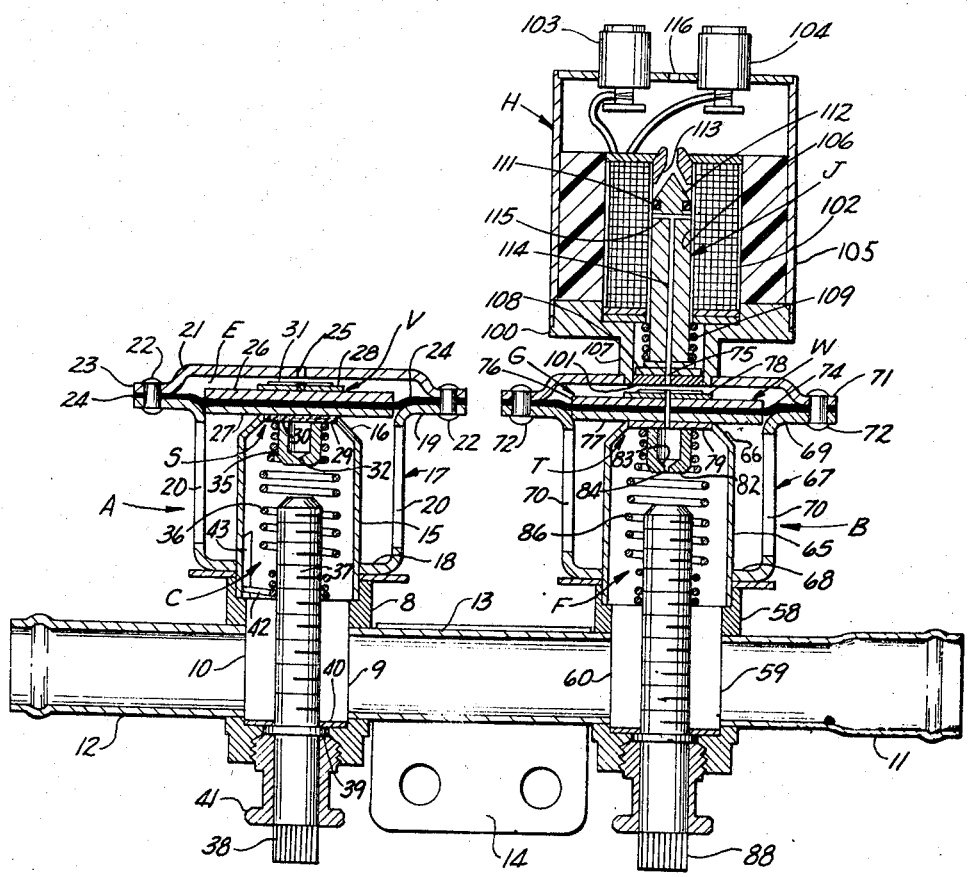
FIG. 2 is a side elevation view of the apparatus shown in FIG. 1, sectioned in the plane of line 2—2 in FIG. 1.

As shown in FIGS. 1 and 2 of the drawings, the apparatus includes two elemental units indicated generally by A and B. The general construction, arrangement, and relationship of the elemental units A and B includes vertically bored valve bodies 8 and 58, respectively. Valve body 8 of unit A is provided with transversely aligned ports 9 and 10 and unit B with similar ports 59 and 60. Port 59 of unit B is fitted with a beaded tube 11 for connection to the air source, for example, of a pressure pneumatic system. Port 10 of unit A is fitted with a beaded tube 12 for connection to the pressure pneumatic system and the pneumatic load. The units are joined by a tube 13 connected between port 9 of unit A and port 60 of unit B. Junction tube 13 provides a convenient location for attaching mounting plate 14 by which the entire apparatus may be secured and mounted.

Elemental Unit A

As shown most clearly in FIG. 2 of the drawings, in unit A, the lower end of an upstanding cylindrical sleeve 15 is fitted in one end of the vertical bore of valve body 8 and, together with body 8, forms a chamber indicated generally at C in communication with the pressure system and closed by a valve closure assembly indicated generally at V and described more fully below. The peripheral edge portion 16 of the upper end of sleeve 15 is turned inwardly to form an annular valve seat S.

A housing spider or cage, generally indicated at 17, of cylindrical form surrounds sleeve 15 as shown in overall form in FIG. 1 and also in cross section in FIG. 2. Spider 17 has a radial base flange 18 encircling sleeve 15 near its lower end and adjacent housing 8. An upper radial flange 19 is spaced above and concentric with base flange 18 and valve sleeve 15 by a number of legs 20 standing in generally circular fashion and extending between and interconnecting flanges 18 and 19 to form a substantially open cylindrical sidewall. As seen in FIG. 2, upper flange 19 lies in a plane slightly above the upper end 16 of sleeve 15.

A circular flanged cap 21 having a raised central area covers the upper opening of housing spider 17 and is attached thereto by means of a number of rivets 22 passed through holes drilled in the flange 23 of cap 21. Clamped between the flange portion 23 of cap 21 and flange 19 of spider 17 is a flexible diaphragm 24 which carries valve closure assembly V and, together with cap 21, forms an air chamber E. A small hole 25 in cap 21 vents chamber E to atmosphere.

Valve closure assembly V preferably includes two valve discs 26 and 27 of slightly less diameter than the unclamped portion of diaphragm 24 and of greater diameter than annular valve seat S mounted on opposite sides of diaphragm 24 concentrically of valve sleeve 15. Washers 28 and 29 are held in place above and below and are clamped together with discs 26 and 27, respectively, to either side of diaphragm 24. The discs and washers are held concentrically of valve sleeve 15 and valve seat S between a shoulder 30 and the upset end 31 of rivet 32. Washer 29 has a controlled clearance fit within the opening provided by the inturned edge 16 of valve sleeve 15.

Rivet 32 is provided with an externally threaded portion 35 extending below diaphragm 24 and adapted to receive and engage the small upper coils of a tension spring 36. The other end of tension spring 36 is adapted to receive the threaded portion 37 of an adjusting member 38 for varying the tension in spring 36. Adjusting member 38 extends out through the lower end of valve body 8 and is secured against axial movement and may be locked in a fixed position of rotation by means of annular flange 39 thereon adapted to bear against and be clamped between an apertured disc 40 fixed in the lower portion of valve body 8 and a bored bearing and lock screw 41 turned into the lowermost threaded portion of valve body 8. Spring 36 is secured against rotation while permitting axial displacement upon the turning of adjustment means 38 by a finger 42 extending radially outward for engagement in an axial groove 43 on the wall of valve sleeve 15. With spring 36 thus prevented from rotating and adjusting member 38 secured against axial movement, rotation of adjusting member 38 acts to vary the tension in spring 36 as threaded portion 37 is turned into and out of the small lower coils of spring 36. In this manner, the force tending to urge valve closure assembly V against valve seat S may be adjusted. Adjusting member 38 may be locked in a particular rotational position and, thus, the tension adjustment on spring 36 fixed by turning lock screw 41 into body 8 and clamping annular flange 39 between bearing disc 40 and the end of lock screw 41.

In operation in a pressure pneumatic system, system pressure acts on the area of a force on valve closure assembly V within inturned annular edge 16 of cylindrical sleeve 15 tending to lift assembly V and separate it from seat S. This tendency is resisted by tension spring 36 which holds valve disc 27 against and washer 29 substantially within inturned annular edge 16.

The area of valve disc 27 and flexible diaphragm 24 radially outside valve sleeve 15, and the entire upper surface of diaphragm 24 and valve disc 26, washer 28, and rivet 32 are acted upon by atmospheric pressure present in chamber E by virtue of vent hole 25 in cap 21.

When pressure in chamber C acting against the area of valve closure assembly V closing the end of valve sleeve 15 exceeds the tension force of spring 36, the valve closure assembly V is lifted off valve seat S and bleeds pressure from the system to atmosphere. This tends to reduce the level of system pressure and, when it falls below the force required to open valve closure assembly V, the valve closes. By adjustment of the tension of spring 36, the pressure in chamber C, i.e. system pressure, necessary to lift valve closure assembly V off valve seat S may be varied and set at a predetermined and desired level. A range of various pressures may be obtained by turning the adjusting member 38 into and out of the end of tension spring 36. Various ranges are obtainable by suitable choice of the spring employed and/or by appropriate sizing of the area of valve closure member V acted upon by system pressure.

Thus, elemental unit A comprising a part of the apparatus embodying this invention is itself a useful and separately usable diaphragm-type adjustable pressure relief valve. The valve is easy and economical to manufacture and enjoys high reliability. A particular feature of this valve is its chatter-free stable operation and ability to hold a near constant system pressure with wide variations in the volume of air required to be handled. This feature can be attributed in large part to washer 29 of valve closure assembly V. As described, washer 29 fits closely with and within annular edge 16 comprising valve seat S so that the washer acts as a piston during the approach of valve closure assembly V to the closed position. This piston effect causes the valve closure assembly V to move further for changes in flow when the unit is called on to dump small amounts of air and the valve closure assembly V is approaching the closed position than when larger amounts of air are to be dumped and/or the valve is not closed. A further advantage of the pressure relief valve comprising elemental unit A is its ability to operate in all spatial orientations.

Elemental Unit B

As may be observed in FIG. 2 of the drawings, elemental units A and B contain a number of similar, if not identical, parts. This is done in the production of embodiments of this invention to effect all possible manufacturing savings and advantage. The two units differ both structurally and functionally, however, in material respects. The similar structure is primarily in the lower housing and parts of the valve closure assembly and adjustment means therefor of the elemental units. Therefore, in view of the foregoing description of the corresponding and similar structure of unit A, these parts of unit B will be described only briefly.

Unit B includes an upstanding cylindrical sleeve 65 fitted in one end of the vertical bore in valve body 58. Body 58 and sleeve 65 form a pressure chamber F in communication with the pneumatic pressure system and closed by a valve closure assembly W cooperating with an annular valve seat T formed by the inwardly-turned peripheral edge portion 66 on the end of the sleeve.

Elemental unit B is provided with a spider 67 having upper and base radial flanges 69 and 68 spaced apart by legs 70 and mounted at one end of valve sleeve 65. Upper radial flange 69 lies in a plane slightly above annular valve seat T.

The upper opening of housing spider 67 is closed by a circular flanged cap 71 having a raised central area. Cap 71 is attached to spider 67 by means of rivets 72. A flexible diaphragm 74 is clamped between flange portion 73 of cap 71 and flange 69 of spider 67. Flexible diaphragm 74 carries and permits valve closure assembly W to move toward and away from valve seat T and into a position of sealing engagement with the seat. Flexible diaphragm 74 also closes the open side and downwardly-facing side, as shown, of flanged cap 71 and, together with cap 71, forms a closed chamber G. A hole or passage 75 in cap 71 vents chamber G to atmosphere.

Valve closure assembly W, like assembly V of unit A, preferably includes two valve discs 76 and 77 of slightly less diameter than the unclamped portion of diaphragm 74 and of greater diameter than annular valve seat T. The two discs 76 and 77 are mounted on opposite sides of diaphragm 74 concentrically of valve sleeve 65 and clamped between washers 78 and 79. Rivet 82 passes through the center of the entire valve closure assembly W and is axially aligned with valve sleeve 65. Washer 79 preferably has a controlled clearance fit with and within the opening provided by annular edge 66 of valve sleeve 65.

Unlike rivet 32 in elemental unit A, rivet 82 in unit B is provided with a counterbore 83 entering from its upset end 81 and terminating a fine orifice or passage 84 extending on through the rivet to its other end. Fine passage 84 places the inlet side of valve seat T and valve closure assembly W in communication with the opposite side of diaphragm 74. The advantage and utility of passage 84 is described below.

Valve closure assembly T is provided with resilient biasing means in the form of tension spring 86 in the same manner as unit A. Tension spring 86 extends between rivet 82 extending below diaphragm 74 and adjusting member 88. The tension spring 86 is adjustable by operation of adjusting member 88 in the same manner as is spring 36 of unit A and its adjusting member 38 and functions in the same manner to increase the pressure required in valve sleeve 65 to unseat valve closure assembly W.

Chamber G formed by cover cap 71 and the upper side of diaphragm 74 and including valve closure assembly W carried by it is connected with atmosphere through vent hole 75 in cap 71. To this extent, chamber G is like chamber E of unit A described above. Unlike chamber E, however, chamber G of unit B is also always connected to system pressure at the inlet side of valve seat T. As shown in the embodiment described, this pressure is conveniently introduced through fine passage 84 in rivet 82 passing through diaphragm 74.

As constituted in the embodiment described, chamber G, including its holes or passages 75 and 84, comprises a pneumatically-operated means for permitting and preventing valve closure W from being opened by system pressure. When vent hole 75 is open to atmosphere, pressure within chamber G is also at atmospheric and valve closure assembly and diaphragm 74 are free to lift off valve seat T when system pressure exceeds a level predetermined by the tension in spring 86. Passage 84 through rivet 82 is preferably relatively fine and smaller than vent hole 75 in cap 71. Thus, although passage 84 is always open and bleeding system or inlet pressure to chamber G, the pressure level therein cannot build above the atmospheric level so long as vent hole 75 is open. Also, a fine passage 84 has a negligible effect on the level of system pressure.

When vent hole 75 is closed, however, system pressure bled through fine passage 84 does build in chamber G up to system pressure level. With system pressure both above and below the diaphragm and valve closure assembly, the valve will not open regardless of the level reached by system pressure. Spring 86 is always acting to keep the valve closed, of course, and the differential in the active areas at system pressure above and below the diaphragm insures the sealing engagement of closure assembly W and valve seat T.

Thus, by simply opening and closing the small vent hole 75 in cap 71 at a small expenditure of force, the considerably greater force able to be developed by system pressure on the underside of valve closure assembly W is controlled. It is apparent that this advantage is gained by self-energizing the device and using system pressure itself to help accomplish its control. Actuation of this self-energized, pneumatically-operated means may be accomplished by any convenient means for effectively opening and closing vent hole 75 in cap 71. In the embodiment shown and described here, an electromagnetic solenoid means is employed, and is described below.

An electromagnetic solenoid indicated generally at H is mounted atop flanged cap 71 and has an armature indicated generally at J arranged to move axially away and toward vent passage 75 as the solenoid is energized and deenergized, respectively. Solenoid H comprises a lower base 100 centrally mounted on flanged cap 71. The central portion 101 of flanged cap 71 radially within base 100 is preferably of nonmagnetic material and contains vent passage 75. The electrical construction of solenoid H is conventional, comprising winding coil 102 connected to terminals 103 and 104 atop the upper cylindrical housing 105 of solenoid H. Winding coil 102 is preferably potted in epoxy within cylindrical housing 105 to insure against air leaks in solenoid H and through its junction to flanged cap 71. The importance of this will be apparent from the description below of the function of solenoid H in the operation of unit B.

Armature J of solenoid H is movable axially of central passage 106 of winding coil 102. As shown in FIG. 2, lower base 100 has a lower cylindrical extension 107 which permits armature J to pass outwardly from central passage 106 and below the lower end of the coil. The lower end of armature J is provided with a radial flange 108. A compression spring 109 is captured and compressed between radial flange 108 and the lower end of winding coil 102 and tends to urge armature J downwardly and toward the position in which it is shown in FIG. 2.

The upper end of armature J as viewed in FIG. 2 is conical and fitted with an O-ring 111 in a groove on its conical surface 112. O-ring 111 cooperates with an annular seat 113 in the upper end of central passage 106 of the winding coil 102 to close the upper end of the central passage when solenoid H is energized and armature J moved upwardly against the force of compression spring 109. Armature J is also provided with an internal axial passage 114 extending from its lower end and communication with vent passage 75 into chamber G to an internal cross passage 115 extending transversely through the armature at a point below O-ring 111. The upper end of cylindrical housing 105 above valve seat 113 is provided with a vent opening 116, placing the upper end of central passage 106 in the winding coil in communication with atmosphere when armature J is in the position shown in FIG. 2.

The O-ring closure 111 and annular seat 113 on the one hand, and axial and cross passages 114 and 115 in armature J on the other, enable solenoid H to effectively close and open chamber G in unit B to atmosphere. When solenoid H is deenergized, compression spring 109 moves armature J into its position shown in FIG. 2, placing chamber G in clear communication with atmosphere. The path of this communication is through passage 75 in flanged cap 71, along axial and cross passages 114 and 115 in armature J, through the upper end of central passage 106 of winding coil 102, between unseated O-ring closure 111 and annular seat 113, and, finally, through vent 116 in cylindrical housing 105. When solenoid H is energized, armature J is raised and O-ring closure 111 is urged into sealing engagement with annular seal 113, effectively closing the path between chamber G in unit B and atmosphere.

From the foregoing description of the pressure sealing and controlling functions performed by and literally within solenoid H, it will be apparent that all unintended paths for pressure must be closed. It is primarily for this reason that winding coil 102 is potted within housing 105 up to the level of valve seat 113.

The opening and closing of the communication path between chamber G in unit B and atmosphere acts to permit and prevent, respectively, the opening and moving away of valve closure assembly W from valve seat T by system pressure. When solenoid H is not energized, chamber G is at atmospheric pressure as described above, permitting valve closure assembly W to move away from valve seat T when system or inlet pressure overcomes the force of tension spring 86. When the inlet pressure to unit B is not great enough to develop the force necessary to overcome the tension in spring 86, the valve closes. Thus, when solenoid H is not energized and its armature J is in the position shown in FIG. 2, unit B operates as a diaphragm-type pressure relief valve having a set point determined by the tension in spring 86.

When solenoid H is energized, chamber G of unit B is closed to atmosphere as described above. As explained above, because of fine passage 84 extending through rivet fastener 82, chamber G is placed in communication with the inlet side of unit B and the pressure introduced through fine passage 84 is confined to chamber G and serves to urge diaphragm 74 and valve closure assembly W into sealing engagement with valve seat T. Thus, the valve is prevented from opening in response to inlet pressure ordinarily sufficient to overcome tension spring 86. Positive closing of the valve is assured because, as the force tending to open it increases, the force tending to close it also increases. Of course, the differential in areas on the upper and lower sides of the diaphragm serve to maintain the valve-closing force greater than the valve-opening force when chamber G is sealed from atmosphere.

It should be noted that chamber G is always supplied through fine passage 84 with inlet pressure to the extent permitted by the fineness of the passage. The passage is preferably fine enough that it has a negligible effect on the level of system pressure when chamber G is maintained at atmospheric pressure. Also, axial and transverse passages 114 and 115, as well as vent passage 75, are preferably larger than fine passage 84 to insure that no unintended pressure buildup occurs in chamber G.

Unit B, like unit A, is also itself useful and separately useable as a diaphragm-type adjustable pressure relief valve that may be selectively permitted to operate or disabled and prevented from operating through control of the pressure in chamber G.

In particular, it includes pneumatically-operated means self-energized by system pressure for controlling the unit's pressure relief valve in which a relatively small force acting to close vent passage 75 prevents opening of the valve by the relatively larger force of system pressure acting on the valve closure assembly within the valve seat. As disclosed herein, solenoid H is structurally and functionally related to the pressure relief portion of elemental unit B and comprises a way of selectively actuating the pneumatically-operated means and controlling the pressure in chamber G.

Operation

As explained above, the embodiment of this invention described and shown in the drawings comprises a two-stage pressure-controlling apparatus. The embodiment consists of two major constituent parts; first, a pressure relief valve responsive to system pressure and having a relatively higher set point at which it opens (described above as elemental unit A) and, second, another pressure relief valve also responsive to system pressure and having a relatively lower set point at which it opens, together with pneumatically operated means for permitting and preventing operation of the valve as desired (described above as elemental unit B).

In operation, the two-stage embodiment shown is connected into a pressure pneumatic system between the system pressure source and system load by means of tubes 11 and 12. System pressure is thus always present in tubes 11, 12, and 13, in valve bodies 8 and 58 and in cylindrical sleeves 15 and 65 up to valve seats S and T.

As shown in FIG. 2 the valve closure assemblies of both units are held against their respective valve seats by their associated tension springs. Atmospheric pressure acts on the upper side of both diaphragms and on that portion of the underside not within the valve seat. This is true of unit B even though system pressure is bled through fine passage 84 to the upper side of diaphragm 74 and into chamber G because the chamber is vented to atmosphere through vent hole 75. As explained above, the control of vent hole 75 is accomplished in the embodiment shown by solenoid H.

As system pressure is increased, it will first reach the set point of unit B, and valve closure assembly W will lift off valve seat T against the tension of spring 86. Pressure will be vented to atmosphere through the open valve until system pressure falls below the set point of the valve and the valve closes. With vent hole 75 open as shown in FIG. 2, the apparatus will continue to operate in this manner and to maintain system pressure at the lower set pressure or stage of the two provided by the apparatus.

When vent hole 75 in flanged cap 71 is closed, system pressure bled through fine passage 84 in valve closure assembly W is confined in chamber G and builds up to provide a self-energizing force holding the valve closed at all system pressures. Vent hole 75 is closed in this embodiment by energizing solenoid H causing armature J to rise and bring O-ring valve closure 111 into sealing engagement with valve seat 113.

Since the relief valve of unit B is prevented from opening, system pressure can increase to above the set point pressure of unit B. When system pressure reaches the set point level of unit A, the higher of the two stages provided by the apparatus, valve closure assembly V lifts off seat S and system pressure is vented to atmosphere until it drops to the unit A set point level and the valve closes. As long as unit B, the first stage, is disabled from operating, system pressure will automatically be limited to the higher set point level of the apparatus by operation of unit A relief valve.

System pressure can be returned to and limited to the lower or first-stage level by venting chamber G to atmosphere. The pressure at which the system is to be limited can thus be selectively controlled by opening and closing the small vent hole 75 of unit B. In the embodiment of this invention shown and described, this is accomplished by deenergizing and energizing solenoid H.

Thus, in light aircraft pressure pneumatic systems, for example, involving a load comprising first-stage or a lower pressure level demand at all times and only periodically a second-stage or higher pressure level demand, this embodiment of the invention can provide the necessary pressure control. The solenoid can be energized and deenergized on a timed basis and the system pressure limits set in accordance with any desired program.

This invention comprehends other combinations of the elemental units described above than the particular embodiment shown and described herein. The apparatus may comprise two or more stages. All stages may be provided by elemental units like unit B. This would permit all units to be disabled and the apparatus to be completely withdrawn from operation in the circuit and from exercising any control or limit on the system pressure if this should be desirable It is also possible within the teachings of this invention to employ other means than a solenoid to open and close the vents of any and all elemental units employed which, like unit B, have pneumatically-operated means employing a self-energizing mode of operation for permitting and preventing the valve from operating. Very simple means may be employed such as a manually-operated mechanical shutoff valve. Also, if a solenoid is used, it can be arranged to be normally energized or deenergized and to normally open or close the vent hole in the pneumatically-operated means.

Those skilled in the art will appreciate that various changes and modifications can be made in the apparatus described herein without departing from the spirit and scope of the invention.

We claim:

1. A multistage pressure-controlling apparatus for selectively limiting the pressure in a pressure pneumatic system to predetermined levels, said pressure-controlling apparatus comprising:

at least two pressure relief valves, each of which has an inlet and a vent outlet and a flow passage therebetween and a cooperating valve seat and valve closure including resilient means biasing said closure into sealing engagement with said valve seat for controlling communication between said inlet and said vent outlet through said flow passage, each of said pressure relief valves being responsive to the pressure level at its inlet to move said valve closure against the urging of said resilient means away from engagement with said valve seat and thereby open said passage when the inlet pressure is above a predetermined level, and to permit said resilient means to close said valve closure against said valve seat and thereby close said passage when the inlet pressure is below a predetermined level, and each of said pressure relief valves being adapted to be connected in parallel with the others and with its inlet in communication with the pneumatic pressure system and its vent in communication with atmosphere;

one of said pressure relief valves being responsive to open at a relatively lower inlet pressure and another of said pressure relief valves being responsive to open at a relatively higher inlet pressure;

pneumatically-operated means associated with said one of said pressure relief valves and energized by pressure from the inlet side of its said valve closure and valve seat for selectively permitting and preventing its associated valve from opening; and whereby said pressure-controlling apparatus limits inlet pressure to the lower of said predetermined levels when said pneumatically-operated means permits the opening of said one of said relief valves and to the higher of said predetermined levels when said pneumatically-operated means prevents the opening of said one of said relief valves.

2. The apparatus of claim 1 together with electromechanical means for selectively actuating said pneumatically-operated means.

3. The apparatus according to claim 1 in which said valve closure of said one of said pressure relief valves is carried on a flexible diaphragm having opposite faces, said flexible diaphragm being mounted on said one of said valves with one face juxtaposed said valve seat and permitting movement of said closure to and away from said seat to open and to close said vent outlet.

4. The apparatus according to claim 3 in which said pneumatically-operated means comprises:
 a chamber, said diaphragm comprising one side of said chamber;
 a relatively fine passage placing said chamber in communication with the inlet side of said valve seat for bleeding pressure from the inlet side into said chamber; and
 a relatively larger control vent passage from said chamber to atmosphere, whereby closing said control vent passage to atmosphere confines inlet pressure introduced into said chamber through said fine passage and tending to urge said diaphragm and said valve closure carried thereby toward sealing engagement with said valve seat and to prevent said valve from opening, and opening said control vent passage vents said chamber to atmosphere and prevents the buildup of pressure above atmospheric in said chamber permitting said valve to open when said resilient biasing is overcome by the force of pressure at said inlet.

5. The apparatus according to claim 4 in which the area of said diaphragm closing the side of said chamber is greater than the area enclosed by said valve seat.

6. The apparatus according to claim 4 in which said relatively fine passage extends through said diaphragm from one face to the opposite face.

7. The apparatus according to claim 4 in which said diaphragm is generally circular and supported about its periphery and concentrically of said valve seat and in which
 said valve closure comprises diaphragm discs of generally the same diameter as the unsupported portion of said diaphragm and clamped on the opposite faces of said diaphragm between two washers held together by a central axial fastener extending through said diaphragm and said valve closure,
 said fine passage comprising a fine bore extending through said fastener.

8. The apparatus of claim 7 in which said washer on the face of said diaphragm adjacent said valve seat has a close clearance fit with said seat providing a piston and cylinder cooperation between said valve closure and said valve seat.

9. The apparatus of claim 4 together with means for selectively actuating said pneumatically-operated means, said actuating means comprising an electromagnetic solenoid mounted together with said one of said pressure relief valves, said solenoid having an armature movable to and between two positions as the solenoid is energized and deenergized, said movable armature closing said control vent passage when in one of its positions and opening said control vent passage when in the other of its positions.

10. The apparatus of claim 9 in which said solenoid comprises a winding coil having a central passage in which said movable armature moves axially between its said two positions, one end of said central passage being in sealed communication with said control vent passage and the other end having a valve seat opening to atmosphere, said armature having a valve closure for cooperating with said valve seat to close said central passage to atmosphere when said armature is in one position and to open said central passage to atmosphere when in its other position.

11. The apparatus of claim 4 in which said other of said pressure relief valves comprises a valve closure carried on a flexible diaphragm having opposite faces, said flexible diaphragm being mounted on said one of said valves with one face juxtaposed said valve seat and permitting movement of said closure to and away from said seat to open and close said vent outlet of said other of said valves.

12. The apparatus of claim 11 together with pneumatically-operated means associated with said other of said pressure relief valves and energized by pressure from the inlet side of its said valve closure and valve seat for selectively permitting and preventing its associated valve from opening whereby said pressure-controlling apparatus limits inlet pressure to the higher of said predetermined limits when said pneumatically-operated means associated with said one of said relief valves prevents the opening of its associated relief valve and when said pneumatically-operated means associated with said other of said relief valves permits the opening of its associated pressure relief valve.

13. A pressure relief valve comprising:
 an inlet and a vent outlet and a flow passage therebetween;
 a cooperating valve seat and valve closure including resilient means biasing said closure into sealing engagement with said valve seat for controlling communication between said inlet and said vent outlet through said flow passage;
 said pressure relief valve being responsive to the pressure level at its inlet to move said valve closure against the urging of said resilient means away from engagement with said valve seat and thereby open said passage when the inlet pressure is above a predetermined level, and to permit said resilient means to close said valve closure against said valve seat and thereby close said passage when the inlet pressure is below a predetermined level, said pressure relief valve being adapted to be connected with its inlet in communication with the pneumatic pressure system and its vent in communication with atmosphere; and
 pneumatically-operated means associated with said pressure relief valve and energized by pressure from the inlet side of its said valve closure and valve seat for selectively permitting and preventing its associated valve from opening, whereby said pressure relief valve limits inlet pressure to said predetermined level when said pneumatically-operated means permits the opening of said relief valve and provides no limit to or control of inlet pressure when said pneumatically-operated means prevents the opening of said relief valve.

14. The relief valve according to claim 13 in which said valve closure is carried on a flexible diaphragm having opposite faces, said flexible diaphragm being mounted on said valve with one face juxtaposed said valve seat and permitting movement of said closure to and away from said seat to open and to close said vent outlet.

15. The relief valve according to claim 14 in which said pneumatically-operated means comprises:
 a chamber, said diaphragm comprising one side of said chamber;
 a relatively fine passage placing said chamber in communication with the inlet side of said valve seat for bleeding pressure from the inlet side into said chamber; and
 a relatively larger control vent passage from said chamber to atmosphere, whereby closing said control vent passage to atmosphere confines inlet pressure introduced into said chamber through said fine passage and tending to urge said diaphragm and said valve closure carried thereby toward sealing engagement with said valve seat and to prevent said valve from opening, and opening said control vent passage vents said chamber to atmosphere and prevents the build up of pressure above atmospheric in said chamber permitting said valve to open when said resilient biasing is overcome by the force of pressure at said inlet.

16. The apparatus of claim 15 together with means for selectively actuating said pneumatically-operated means, said actuating means comprising an electromagnetic solenoid mounted together with said one of said pressure relief valves, said solenoid comprising a winding coil having a central passage and an armature movable axially in said central passage to and between two positions as the solenoid is energized and deenergized, said movable armature closing said control vent passage when in one of its positions and opening said control vent passage when in the other of its positions, one end of said central passage being in sealed communication with said control vent passage and the other end having a valve seat opening to atmosphere, said armature having a valve closure for cooperating with said valve seat to close said central passage to atmosphere when said armature is in one position and to open said central passage to atmosphere when in its other position.